(No Model.)
C. E. SCRIBNER.
OPERATOR'S TESTING APPARATUS FOR MULTIPLE SWITCH BOARDS.
No. 330,060. Patented Nov. 10, 1885.
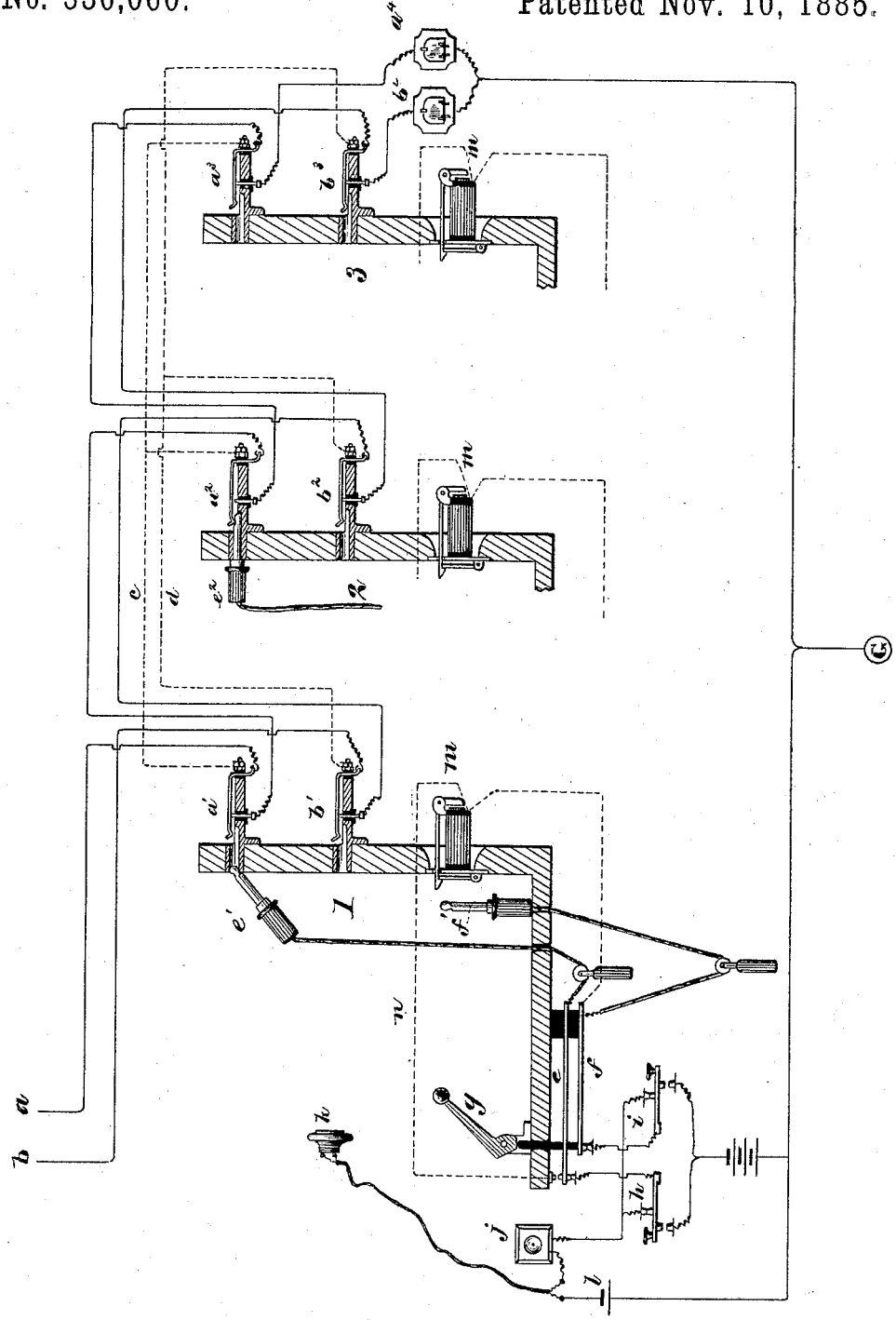
Attest
Paul A. Staley
Chas. A. Warren.
By his Attorney
Inventor
Charles E. Scribner
L. P. Barton
N. PETERS, Photo-Lithographer, Washington, D. C.

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

OPERATOR'S TESTING APPARATUS FOR MULTIPLE SWITCH-BOARDS.

SPECIFICATION forming part of Letters Patent No. 330,060, dated November 10, 1885.

Application filed October 22, 1883. Serial No. 109,649. (No model.)

*To all whom it may concern:*

Be it known that I, CHARLES E. SCRIBNER, a citizen of the United States, residing at Chicago, in the county of Cook and State of Illinois, have invented a certain new and useful Improvement in Operators' Testing Apparatus for Multiple Switch-Boards, of which the following is a full, clear, concise, and exact description, reference being had to the accompanying drawing, forming a part of this specification.

My invention relates to operators' testing apparatus for multiple switch-boards of a telephone-exchange. It has become common in telephone-exchanges to use two or more multiple switch-boards, each subscriber's telephone-line being connected to a switch or spring-jack on each of said boards. Connections may be made at either board between any two subscribers. The connections are made by means of flexible cords having terminal plugs arranged in pairs, the plugs of one pair being inserted in the respective switches of the two subscribers who are to be connected thereby. To avoid making a connection at one board with a line which is already in use at another board, testing apparatus is employed whereby an operator, before making a connection, can ascertain at either board whether a given line is in use at any other board.

My invention, herein described, is designed to furnish the means whereby such a test may be made with the same plugs with which the connections are made, the test being made at the first contact of any connecting-plug with the switch into which it is to be inserted.

In the accompanying drawing, which is illustrative of my invention, I have shown three multiple switch-boards, 1, 2, and 3, to which are connected two telephone-lines, $a$ and $b$. These telephone-lines are connected to spring-jacks $a'\ a^2\ a^3$ and $b'\ b^2\ b^3$ on the different boards, and thence through the annunciators $a^4\ b^4$ to ground in the usual manner.

The operator's apparatus and connections are shown at board 1. Similar apparatus is provided for each of the boards, but I have thought it sufficient to show it at board 1 only. The connecting-plugs $e'\ f'$ are connected by the usual flexible cords to independent spring-strips of a loop-key which is adapted to be held positively in either position by means of a cam-lever, $g$, or equivalent device. The circuit of the connecting-plugs when the loop-key is held in the position shown may be traced through the customary calling-keys $h\ i$, and from thence by a "third leg" connection through the operator's transmitter $j$, telephone $k$, and a testing-battery, $l$, to ground. The metal frame of each spring-jack switch is insulated from its spring and contact-point, so that the circuit of a telephone-line through its several spring-jacks does not include said metal frames. All the frames, however, of the spring-jacks belonging to one telephone-line are connected together in a series, forming an open circuit, as indicated by dotted lines $c\ d$.

When a plug is inserted in a spring-jack— for example, plug $e^2$—as shown at board 2, a connection is established between the spring and metal frame of the said spring-jack, as well as with its cord, thus crossing the telephone-line connected to said spring-jack with the line which connects the series of metallic frames.

If a connection is to be made at any board, the operator takes either plug of a pair—for instance, plug $e'$ at board 1—and inserts it in the spring-jack of the telephone-line to be connected. If the said telephone-line—for example, line $a$—is in use at any other board, at the first contact of the plug $e'$ with the metal frame of spring-jack $a'$ the testing-battery $l$ will find circuit through the operator's telephone-outfit, thence through plug $e'$, spring-jack $a'$, and line $c$ to the cross established at spring-jack $a^2$ by the plug $e^2$, and from thence by telephone-line $a$ to ground at the subscriber's station. A click will thus be produced in the operator's telephone $k$, and she, listening, will know at once that the line is in use. If the line be not in use at any other board, the testing-battery will not find circuit at the first contact of the plug with the spring-jack frame, and no click will be given. The operator will therefore press the plug into the spring-jack. The same result will follow, no matter which plug of a pair is used, and the result will be the same, whether one plug of the pair is already inserted in a spring-jack or not. In case one plug of a pair has already been inserted in a spring-jack, a constant current from battery $l$ will flow through this connection; but if upon testing with the other plug another outlet for the battery $l$ is established by means of a cross, as before described, the battery-current will divide, and sufficient current will pass through the new outlet to produce a click in telephone $k$, as before. It will thus be seen that a test will always be made by the operator while in the act of making a connection at the first contact of either plug of a pair with a spring-jack at either board.

When a connection has been established between two subscribers, the cam-lever $g$ will be thrown down and the spring-strips $e\ f$ will close the circuit of the connected subscribers through the clearing-out annunciator $m$, as indicated by dotted line $n$, and at the same time cam-lever $g$, as it is thus thrown down, will disconnect the calling-keys, the operator's telephone-outfit, and the testing-battery $l$ from the circuit.

This method of connecting the clearing out annunciator into circuit at the same time that the operator's telephone-outfit is thrown out of circuit, and vice versa, I intend making the subject of another application. I have not, therefore, described it particularly herein.

My invention admits of many modifications, as, for instance, instead of using spring-jack switches with insulated frames, an open line independent of the switches may be used with each series of switches, said line being adapted to form a cross with the telephone-line belonging to said series whenever a connection is made at any switch of the series.

As to the state of the art prior to my invention, reference is made to Letters Patent No. 269,238, granted Shiras and Eckert, December 19, 1882.

I do not limit myself to the particular construction shown, but claim, broadly, as my invention—

1. In a multiple switch-board system of telephone-exchange, the combination, with switches, one switch for each telephone-line upon each board, and a normally-open line for each telephone-line, of connecting plugs and cords, and a ground-line branched from the circuit of said connecting-plugs, said ground-line including a telephone and testing-battery, whereby a test may be made with either one of a pair of connecting-plugs at any board, substantially as specified.

2. In a multiple switch-board, the combination, with switches having insulated metallic frames, the frames of all the switches of one telephone-line being connected together in a series, of connecting-cords with terminal plugs arranged in pairs, a ground-circuit containing a telephone and a testing-battery, and means for connecting said ground-circuit with any pair of connecting-plugs, substantially as and for the purpose specified.

3. In a multiple switch-board, the combination, with spring-jacks having insulated metallic frames, the metallic frames of all the spring-jacks of one telephone-line being connected in a series, as described, of connecting-cords with terminal plugs arranged in pairs, a loop-key for each pair of plugs, and a pair of calling-keys to which a ground-circuit containing a telephone and testing-battery is normally connected, said calling-keys being adapted to be looped into the circuit of any pair of plugs, substantially as and for the purpose set forth.

4. The combination, with the different multiple switch-boards of a telephone-exchange, of pairs of flexible cords provided with terminal plugs, a branch-circuit to ground, including a telephone and test-battery, calling-keys, and loop-keys for each pair of cords, and means for normally holding the loop-keys of a given pair of cords in the circuit of the calling-keys of said pair, substantially as and for the purpose set forth.

5. In a telephone-exchange, the combination, with a multiple switch-board provided with switches for the different lines, of testing apparatus consisting of a pair of flexible cords provided with terminal plugs, a branch circuit to ground, including a telephone and battery, and switching apparatus for connecting and disconnecting said pair of flexible connecting-cords and the said branch circuit, substantially as specified.

In witness whereof I hereunto subscribe my name this 20th day of October, A. D. 1883.

CHARLES E. SCRIBNER.

Witnesses:
PAUL A. STALEY,
GEORGE P. BARTON.